May 16, 1967 R. E. WILLIAMS 3,320,358

FLICKER REDUCTION CIRCUIT FOR COLOR TELEVISION RECEIVERS

Filed April 21, 1965 2 Sheets-Sheet 1

INVENTOR.

RICHARD E. WILLIAMS

BY

Hurvitz & Rose

May 16, 1967 R. E. WILLIAMS 3,320,358

FLICKER REDUCTION CIRCUIT FOR COLOR TELEVISION RECEIVERS

Filed April 21, 1965 2 Sheets-Sheet 2

INVENTOR.
RICHARD E. WILLIAMS
BY
Hurvitz & Rose

United States Patent Office
3,320,358
Patented May 16, 1967

3,320,358
FLICKER REDUCTION CIRCUIT FOR COLOR TELEVISION RECEIVERS

Richard E. Williams, Fairfax, Va., assignor to Scope, Incorporated, Falls Church, Va., a corporation of New Hampshire Filed Apr. 21, 1965, Ser. No. 449,793
9 Claims. (Cl. 178—5.4)

The present invention relates to a color television system and more particularly relates to means for reducing visual flicker components in the television display. The invention is particularly effective when applied to color television receivers in which the various primary colors comprising the display image are sampled at moderately low rates such as is the case in a field sequential system.

It has long been known that if the human eye is subjected to a flickering display of specified brightness and the rate of the flicker is gradually increased, there occurs a critical fusion frequency or flicker rate at which the eye is no longer able to discern flicker. The choice of a 60 c.p.s. field rate for television transmission in the U.S.A. was largely predicated upon the need to exceed the critical fusion frequency in a bright image. An effective frame rate of 48 per second has also been adopted in the motion picture industry as a means of exceeding the critical fusion frequency at the image brightnesses involved therein.

It has been demonstrated by many researchers that the ability to discern flicker is dependent upon a number of factors, among which are the flicker frequency, the average brightness or luminance of the display, the crest-to-trough ratio of the flicker modulation, the flicker duty cycle, etc. The situation is further complicated by areal summation effects; i.e., the size of the flickering image, and certain differences in flicker sensitivity of the human eye as the image traverses the retina from foveal to peripheral areas.

In the case of a display device whose brightness is proportional to the amplitude of a display signal, a rather simple relationship can exist between visual discernment of flicker and display signal components of specific frequencies and amplitudes. In essence, display signal components lying at frequencies below 60 c.p.s. and exhibiting sufficient amplitudes can give rise to discernible flicker.

The novel system of the present invention senses amplitude and frequency combinations and automatically reduces the amplitude component until the manifested flicker is reduced to an acceptable level. The present invention performs this operation utilizing only passive components and a single non-linear element in a circuit of great simplicity.

One objective of the present invention is, therefore, a simple and economical system for reducing the flicker manifested in a television display.

Another object of the present invention is to provide means whereby the flicker manifested in a field sequential color television system is reduced to an acceptable level.

A further object of the present invention is the provision of resistive capacitive means for sensing amplitude frequency combinations of display signals in a manner closely related to their ability to produce flicker effects in a display device.

The foregoing and many other objects of the invention will become apparent in the following description and drawings in which.

Throughout the drawings, like reference characters refer to like elements in the various figures.

Figure 1:
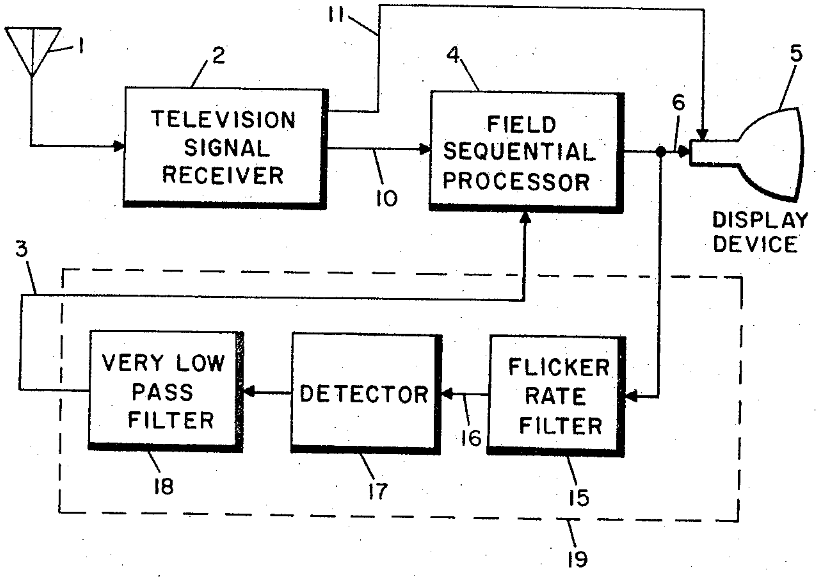
FIGURE 1 is a block diagram of a typical field sequential color television receiver showing the functioning of the present invention.

Referring first to FIGURE 1, showing a block diagram of a color television receiver employing the novel flicker suppression system of the present invention, an antenna 1 intercepts a transmitted color television signal and provides it to a conventional television signal receiver 2, assumed to be of the NTSC type. The signal receiver 2 is comprised of those elements ordinarily necessary for processing the intercepted signal to extract the modulation components, and may include radio frequency circuits, local oscillator, intermediate frequency amplifier, synchronization circuits, deflection circuits, sound and video amplifiers, and power supply. More specifically, the signal receiver 2 is assumed to include all circuits necessary for luminance or monochrome display and additionally provides an output bus 10, carrying chrominance or color signal. The signal on bus 10 is normally selectively isolated in the case of National Television Standards Committee system by means of a bandpass filter within the signal receiver 2, that extracts the 3.58 mc. color subcarrier and sidebands thereof. Since all of the functions of the signal receiver 2 are conventional and well known, no further detailed breakdown of its circuits would be germane to a description of the present invention, and these are accordingly dispensed with, in the interest of supplying the exposition of the invention.

For expository purposes, the television signal receiver 2 is assumed to provide a detected output containing a luminance signal on bus 11 and chrominance information on bus 10, that can be processed by a field sequential processor 4. The detailed design of the field sequential processor 4 can be similar to that described in the Proceedings of the IRE, October, 1951; pp. 1288–1313, by P. Goldmark, et al. The significance of the sequential processor 4 to the present invention lies in its tendency to produce "separation" color display signals at a rate of 20 c.p.s. when a three-color system is provided for a 60 c.p.s. transmitted field rate. The display device 5 is thus provided with a display signal corresponding to a single primary, say red, for $\frac{1}{60}$ of a second, green for the next $\frac{1}{60}$ of a second, blue for the following $\frac{1}{60}$ of a second, and so on. In the vast majority of transmitted scenes, fine structure information in the display signals will occur in almost every field. A human observer watching the display device 5 will in such cases not discern objectionable flicker because the flicker occurs in small areas and exhibits relatively random phases at various points in the image. For example, if the display were to exhibit a small red ball in a small patch of green grass, the luminance of the ball would be maximum during the red field and very low during the succeeding blue and green fields. The immediately surrounding patch of green grass, however, would be of low luminance during the red and blue fields and of high luminance during the green field. At normal viewing distance the flicker manifestation from the red ball is largely outphased by the opposing flicker of the surrounding green grass, and the flicker manifestation to the viewer is largely cancelled.

If, on the other hand, the image on the display device were that of a large blue sky with negligible contributions from other primary colors, the entire face of the display device 5 would exhibit high luminance during the blue field and negligible luminance during the succeeding red and green fields. Since the blue field repeats at a rate of only 20 times per second, a very severe flicker would be manifested to the human observer.

The output of the field sequential processor 4 normally consists of a chrominance display signal on a bus 6. In the case of a mixed color scene as described earlier, the display signal on bus 6 will be comprised of rather high frequencies corresponding to the image fine structure. Thus, the display signal would take a form similar to that of trace A of FIGURE 2. It is seen that while the fine structure varies drastically among green, red, and blue fields, at time intervals G, R and B of the plot, the low-frequency component of the signal as would be obtained, for example, by low-pass filtering is very low in amplitude as shown by trace A' of FIGURE 2.

In the second example provided, that of a blue sky, the display signal will take the form of trace B. It is seen that the output during green and red fields is lower than normal, whereas the output during the B field is higher than normal. Low-pass filtering of this signal shows that a strong energy component at a low frequency of 20 c.p.s. is present as is shown in trace B'.

Figure 3:
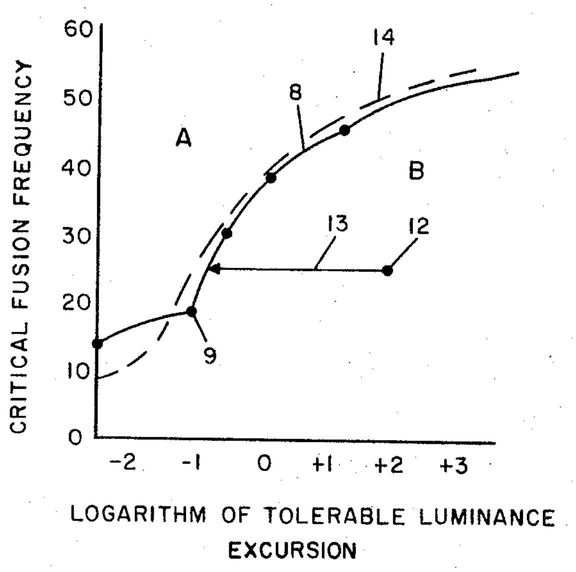
FIGURE 3 is a plot of critical fusion frequency versus the logarithm of tolerable luminance excursion as measured by the human eye.

Numerous researchers have determined that tolerable luminance excursion is related to flicker frequency by a curve 8 of FIGURE 3. The knee of the curve observed at point 9 relates to the transition between rod and cone vision in the human retina. The curve 8 shows that fairly high luminance excursion can be tolerated at a high flicker frequency, say 50 c.p.s., whereas far less luminance excursion can be tolerated at a low-flicker frequency such as 20 c.p.s. The region A bounded by and above or to the left of curve 8 can be considered an area of flicker-free operation, whereas the region B below the curve or to its right is an area of excessive flicker. The primary objective of the current invention is to sense whenever the combination of luminance excursion and flicker frequency has penetrated into area B, and then quickly and automatically to move the offending combination into the acceptable area A, or at least substantially so.

Since the field sequential processor 4 of FIGURE 1 implicity determines the fundamental flicker frequency (e.g., 20 c.p.s. for a three-color system or 30 c.p.s for a two-color system when a 60 c.p.s. field rate is involved), the present invention operates upon the luminance excursion to correct the flicker. If, for example, a combination of luminance excursion and flicker frequency occurring at locus point 12 of FIGURE 3 were encountered, the present invention would reduce luminance excursion causing the locus point 12 to travel along the line of transversal 13 until it passed into the proper region A. With reference to FIGURE 3, it can be seen that lower critical fusion frequencies will often be associated with larger luminance excursion corrections, whereas higher fusion frequencies will be associated with lesser luminance excursion corrections. It can also be seen that when flicker frequencies higher than 60 c.p.s. are encountered, no correction at all is necessary since the boundary graph 8 becomes approximately horizontal at that region.

The present invention electrically establishes a threshold shown by the dashed line 14 of FIGURE 3 and adjusts the amplitude of the luminance excursion so that the signals supplied to the display device 5 of FIGURE 1 will always lie in region A. Additionally, the present invention applies minimal correction so that the change in luminance excursion, as exemplified by vector 13 of FIGURE 3, is not greater than necessary.

Figure 4:
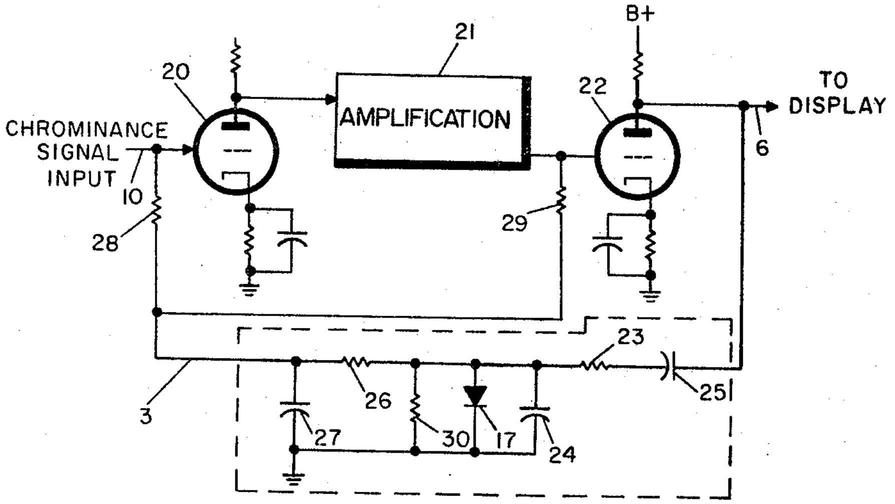
FIGURE 4 is a schematic circuit diagram of a typical embodiment of the present invention showing a schematic electronic component arrangement.

Curve 14, FIGURE 3, is as close an approximation to the curve 8 as can reasonably be generated electrically, by means of an economical circuit, and has the general form of the response of a series of low-pass filter sections in the feedback loop of FIGURE 4. Physiological/psychological measurements on humans show the cusp 9 of FIGURE 3 to be largely the result of a transition between foveal (photopic) and peripheral (scotopic) sensitivity in the human eye. Scotopic sensitivity is normally predominant at low brightness levels.

Figure 2:
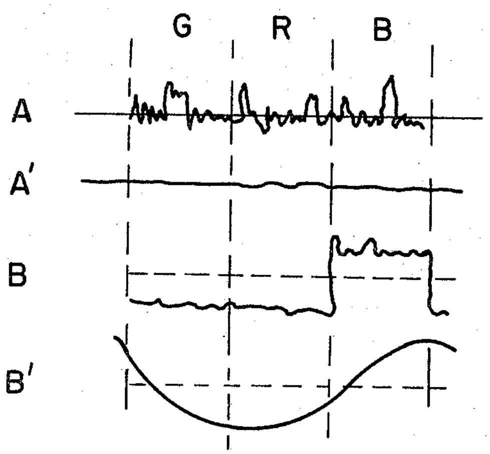
FIGURE 2 shows filtered and unfiltered examples of display signals having differing flicker tendencies.

Referring to FIGURE 1, a flicker rate filter 15 samples the display signal on bus 6 and is provided with a low-pass characteristic so as to produce outputs such as A' and B' of FIGURE 2. The flicker rate filter 15 drastically attenuates signal components at frequencies above 60 c.p.s. but provides less attenuation to lower frequency components in the display signal. At very low flicker frequencies, such as 20 c.p.s., the flicker rate filter 15 provides very little attenuation. The output of the flicker rate filter 15, as observed on bus 16, therefore has an amplitude that is almost directly related to the tendency for the display signal on bus 6 to produce discernible flicker on the face of the display device 5. The flicker signal on bus 16 is detected by means of a detector or nonlinear device 17 and converted to a slowly varying potential by means of a very low-pass flicker rate filter device 18. The time constant of the very low-pass filter 18 is in the order of one-half to one second, an interval that is short enough to remove flicker before the human eye can discern it yet is long enough to avoid passing flicker components back into the signal processing portions of the color receiver.

The polarity of the detector 17 is chosen so as to produce a control potential on bus 3 of a polarity suitable for reducing the effective gain applied to the chrominance display signal of bus 6 when the flicker signal at bus 16 is large and vice versa. It is thus the case that as major flicker components are manifested on the display signal, the effective gain of the color signal is reduced and the flicker component is reduced to an acceptable region A of FIGURE 3. The process is continuous and automatic, and at all times provides just sufficient correction to reduce the flicker to an acceptable level.

Although it is the case that the chrominance component of the signal is electrically reduced by action of the flicker reduction circuit 19 of FIGURE 1, certain phenomena associated with color vision tend to mitigate the observer's sensing of the reduction in chrominance. These phenomena are the so-called "surround" effect and certain aspects of color acuity. Suppose, for example, that the image consisted of a small red airplane in a large blue sky. Since the display image is predominantly blue, a strong flicker component would be manifested and the flicker reduction system 15, 17, and 18 of FIGURE 1 would reduce the chrominance signal on bus 6. Uniform gain reduction is applied to all chrominance components causing both the blue and the red to become paler, or less saturated. Because the blue represents so large an area, however, it needs less saturation to be discerned as "blue" than would a small area. The ability to discern colors in large areas more readily has long been known and is exploited in the "mixed highs" color transmission standards utilized in the U.S.A. at present. It is thus the case that while the sky would not consist of a highly saturated blue, it still would remain "blue" of high apparent saturation because of the large area involved.

The small red aircraft, on the other hand, would under normal conditions desaturate to a pale pink and thus appear to lose most of its coloring. It is important to note, however, that even a colorless area surrounded by a predominant hue will tend to assume a hue complementary to the surround, in this case orange. The very factors that contribute to flicker and in the present invention, a reduction of electrical chrominance signal thus tend to maintain apparent saturation in the perceived image. It can be seen with reference to the graph B of FIGURE 2 that the primary color that "takes over" the flicker reduction circuit tends to be complementary to the suppressed chrominance elements. In graph B blue predominates, and is complementary to the red-green combination, or orange. (Additive primaries are assumed for illustrative purposes.)

An embodiment of the flicker reduction circuit 19 of FIGURE 1 is schematically shown in FIGURE 4. The field sequential processor 4 of FIGURE 1 can be arbitrarily complex and may include elements such as chrominance amplifiers, tri-stable switches, synchronous demodulators, burst synchronization circuits, etc. The elements of interest to the present invention are those having an influence on the chrominance display signal gain. For purposes of exposition, therefore, FIGURE 4 reduces the processor 4 to an input stage 20 followed by amplification 21 and an output stage 22. The chrominance signal input on bus 10 is thus amplified and processed and appears eventually as a display signal on bus 6. The display signal on bus 6 is passed through an RC filter 23, 24 whose output as seen at bus 16 drops at a rate of approximately 6 db per octave as frequencies between 20 c.p.s. and 60 c.p.s. are traversed. In some cases the attenuation may need to be steeper, in which case a multiple-section, or sharper-cutoff filter can be substituted for the RC filter 23, 24. The signal produced at bus 16 thus has an amplitude that is roughly proportional to the tendency for the display signal on bus 6 to manifest flicker on the display device 5 of FIGURE 1.

The flicker signal on bus 16 is rectified by the non-linear detector 17 so as to produce a D.-C. component proportional to the flicker signal amplitude on bus 16. The D.-C. blocking capacitor 25 is of a sufficiently large value to pass the low frequencies involved. The capacitor 25 is not necessary if the display signal bus 6 is devoid of D.-C. potential.

A very low-pass RC filter consisting of resistance 26 and capacitance 27 removes flicker frequency components from the output of the detector 17 and produces at the output bus 3 a potential that can vary at rates not in excess of approximaely 4 c.p.s. Thus, if a strong flicker signal were to appear on bus 16 for an interval of one-quarter second or longer, a potential would commence building up on the output bus 3 by dint of the rectification action of detector 17 and the low-pass filtering action of the RC network 26, 27. The polarity of the detector 17 is chosen so as to create a negative-going potential on bus 3 as the flicker signal on bus 16 is increased. The negative-going potential serves to drive the control grids of both controlled stages 20, 22 negative via grid leak resistors 28 and 29. The stages 20 and 22 thus are reduced in gain and the display signal appearing on bus 6 is automatically reduced.

The entire system takes the form of a convergent feedback network with an overall reaction time of one-quarter second or longer and with flicker selective properties. Because of the convergent nature of the feedback, the degree of amplification 21 involved in the chrominance signal and the display signal processor is not critical.

Typical values for a flicker reduction network in accordance with the teachings of the present invention and FIGURE 4 are as follows:

| | | |
|---|---|---|
| Capacitor **25** | microfarad | 0.1 |
| Resistor **23** | | 220K |
| Capacitor **24** | microfarad | .02 |
| Detector **17** | diode | IN90 |
| Resistor **30** | megohms | 2.2 |
| Resistor **26** | do | 3.3 |
| Capacitor **27** | microfarad | .25 |

In the foregoing, the invention has been described solely in connection with a specific illustrative embodiment thereof. Since many variations and modifications will be obvious to those skilled in the art, I desire to be bound not by the specific disclosures herein contained, but only by the appended claims.

I claim:

1. In a color television system having a television signal receiver, a field sequential processor, a cathode ray display device for displaying color pictures in response to the video output of said receiver and the chrominance signal provided by said field sequential processor, means for filtering from said chrominance signal those frequency components falling below about sixty cycles per second and carrying flicker frequency information, means responsive to said flicker frequency information for developing a direct current control signal, and means responsive to said direct current control signal for reducing the gain of said field sequential processor for a period of time and to an extent adequate to remove manifest flicker of color in said pictures.

2. The combination according to claim 1 wherein said means for filtering is a low pass filter having minimum response at frequencies above 60 c.p.s. and continually increasing response to at least 20 c.p.s., and said means for reducing gain includes a low pass filter having a time constant of about .25 to .5 second.

3. The combination according to claim 1, wherein said means for filtering provides a response as a function of frequency adequate to reduce luminance excursions substantially only to tolerable levels for all fusion frequencies, where a tolerable level of luminance excursion at any frequency is that level for which picture flicker is not manifest to the human eye.

4. In a visual display system wherein visual displays subject to flicker are generated in a scanning sequence in response to a signal varying in real time, said signal including frequencies above and below sixty cycles per second, means for generating a control signal in response to only said frequencies falling below sixty cycles per second, means for reducing the variations of amplitude of said control signal, said last means including a low pass filter having a time constant on the order of less than one second, whereby said low pass filter provides a slowly varying further control signal, and means responsive to said further control signal for reducing the amplitude of said signal varying in real time sufficiently substantially to reduce said flicker.

5. In a color television system, a source of chrominance signal input, a display, an amplifier connected intermediate said source and said display, said amplifier having an output terminal, and a feedback circuit connected between said output terminal and said source, said feedback circuit including a low pass filter responsive only to frequencies below sixty cycles per second and having a time constant on the order of below one cycle per second.

6. In a color television system subject to flicker, a source of chrominance signal, a display signal bus, amplifier means intermediate said source and said bus, said amplifier means being gain controllable, and means for controlling said gain of said amplifier means when said flicker is relatively large and reducing said gain when said flicker is relatively small, said gains being selected to reduce said flicker to an acceptable level.

7. A color television receiver system including a field sequential processor, said field sequential processor including amplifier means for field sequential signals, means responsive to signal derived from said field sequential processor for filtering a flicker component from said last-named signal, a detector means connected in cascade with said means for filtering for detecting said component, and a very low pass filter connected in cascade with said detector means, said very low pass filter having a time constant in the order of less than one second, and means responsive to the output of said very low pass filter for reducing gain of said amplifier means.

8. In a color television system having a television signal receiver, a field sequential processor, a cathode ray display device for displaying color pictures in response to the video output of said receiver and the chrominance signal provided by said field sequential processor, means for filtering from said chrominance signal those frequency components falling below about sixty cycles per second and carrying flicker frequency information, means responsive to said flicker frequency information for developing a direct current control signal, and means responsive to said direct current control signal for reducing the gain of said field sequential processor for a period of time and to an extent adequate to remove manifest flicker of color in said pictures.

9. The combination according to claim 8 wherein said means for filtering is a low pass filter having minimum response at about 60 c.p.s. and continually increasing response to at least 20 c.p.s., said means for reducing gain includes a low pass filter having a time constant of about .25 to .5 second.

References Cited by the Examiner

UNITED STATES PATENTS

| | | | |
|---|---|---|---|
| 2,531,544 | 11/1950 | Wendt | 178—5.4 |
| 2,543,772 | 3/1951 | Goldmark | 178—5.4 |
| 2,654,798 | 10/1953 | Herbst | 178—5.4 |

DAVID G. REDINBAUGH, *Primary Examiner.*

W. A. O'BRIEN, *Assistant Examiner.*